(12) United States Patent
Golitschek Edler von Elbwart

(10) Patent No.: US 12,101,275 B2
(45) Date of Patent: Sep. 24, 2024

(54) PERFORMING ACTIONS BASED ON A GROUP SWITCHING FLAG

(71) Applicant: Lenovo (Singapore) PTE. LTD., New Tech Park (SG)

(72) Inventor: Alexander Johann Maria Golitschek Edler von Elbwart, Darmstadt (DE)

(73) Assignee: Lenovo (Singapore) Pte. Ltd., New Tech Park (SG)

(*) Notice: Subject to any disclaimer, the term of this patent is extended or adjusted under 35 U.S.C. 154(b) by 394 days.

(21) Appl. No.: 17/279,297

(22) PCT Filed: Nov. 6, 2020

(86) PCT No.: PCT/IB2020/060442
§ 371 (c)(1),
(2) Date: Mar. 24, 2021

(87) PCT Pub. No.: WO2021/099872
PCT Pub. Date: May 27, 2021

(65) Prior Publication Data
US 2022/0311588 A1    Sep. 29, 2022

Related U.S. Application Data

(60) Provisional application No. 62/937,776, filed on Nov. 19, 2019.

(51) Int. Cl.
*H04L 5/00*    (2006.01)
*H04W 24/08*   (2009.01)

(52) U.S. Cl.
CPC .......... *H04L 5/0091* (2013.01); *H04L 5/0053* (2013.01); *H04W 24/08* (2013.01)

(58) Field of Classification Search
CPC ..... H04L 5/0091; H04L 5/0053; H04W 24/08
See application file for complete search history.

(56) References Cited

U.S. PATENT DOCUMENTS

| 2014/0247816 A1 | 9/2014 | Kim et al. |
| 2020/0154413 A1* | 5/2020 | Hosseini ........... H04W 72/0446 |

FOREIGN PATENT DOCUMENTS

| CN | 106027220 A | 10/2016 |
| CN | 109417762 A | 3/2019 |
| WO | 2019035701 A1 | 2/2019 |

OTHER PUBLICATIONS

Ericsson, DL signals and channels for NR-U, Nov. 18-22, 2019, 3GPP TSG RAN WG1 #99, R1-1912086, Reno, USA (Year: 2019).*

(Continued)

*Primary Examiner* — Said M Elnoubi
(74) *Attorney, Agent, or Firm* — Kunzler Bean & Adamson

(57) ABSTRACT

Apparatuses, methods, and systems are disclosed for performing actions based on a group switching flag. One method (400) includes configuring (402) a user equipment with a plurality of groups of search space sets, wherein: the plurality of groups of search space sets comprises a first group of search space sets and a second group of search space sets; and the user equipment changes between monitoring the first group of search space sets and monitoring the second group of search space sets. The method (400) includes performing (404): a first set of actions in response to a presence of a group switching flag; a second set of actions in response to no presence of the group switching flag; or a combination thereof.

20 Claims, 5 Drawing Sheets

(56) References Cited

OTHER PUBLICATIONS

Mediatek Inc, DL Signals and Channels for NR-U Operation, Nov. 18-22, 2019, 3GPP TSG RAN WG1 #99, R1- 1912086, Reno, USA (Year: 2019).*
PCT/IB2020/060442, "Notification of Transmittal of the International Search Report and the Written Opinion of the International Searching Authority, or the Declaration", ISA, dated Feb. 8, 2021, pp. 1-15.
Mediatek Inc., DL Signals and Channels for NR-U Operation, 3GPP TSG RAN WG1 #99, Nov. 18-22, 2019, pp. 1-7.
Ericsson "DL signals and channels for NR-U", 3GPP TSG-RAN WG1 Meeting #98bis R1-1912707 , Nov. 18-22, 2019, pp. 1-25.

* cited by examiner

PERFORMING ACTIONS BASED ON A GROUP SWITCHING FLAG

CROSS-REFERENCE TO RELATED APPLICATIONS

This application claims priority to U.S. Patent Application Ser. No. 62/937,776 entitled "APPARATUSES, METHODS, AND SYSTEMS FOR PDCCH MONITORING SWITCHING BEHAVIOR" and filed on Nov. 19, 2019 for Alexander Johann Maria Golitschek Edler von Elbwart, which is incorporated herein by reference in its entirety.

FIELD

The subject matter disclosed herein relates generally to wireless communications and more particularly relates to performing actions based on a group switching flag.

BACKGROUND

The following abbreviations are herewith defined, at least some of which are referred to within the following description: Third Generation Partnership Project ("3GPP"), 5$^{th}$ Generation ("5G"), QoS for NR V2X Communication ("5QI/PQI"), Authentication, Authorization, and Accounting ("AAA"), Positive-Acknowledgment ("ACK"), Application Function ("AF"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Application Server ("AS"), Application Service Provider ("ASP"), Autonomous Uplink ("AUL"), Authentication Server Function ("AUSF"), Authentication Token ("AUTN"), Background Data ("BD"), Background Data Transfer ("BDT"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Channel Access Priority Class ("CAPC"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Configured Grant ("CG"), Closed-Loop ("CL"), Coordinated Multipoint ("CoMP"), Channel Occupancy ("CO"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink Feedback Information ("DFI"), Downlink ("DL"), Demodulation Reference Signal ("DMRS"), Data Network Name ("DNN"), Data Radio Bearer ("DRB"), Discontinuous Reception ("DRX"), Dedicated Short-Range Communications ("DSRC"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2—24.25 GHz to 52.6 GHz ("FR2"), Universal Geographical Area Description ("GAD"), Guaranteed Bit Rate ("GBR"), Group Common Physical Downlink Control Channel ("GC-PDCCH"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), General Public Subscription Identifier ("GPSI"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Key Management Function ("KMF"), Layer 1 ("L1"), Layer 2 ("L2"), Layer 3 ("L3"), Licensed Assisted Access ("LAA"), Local Area Data Network ("LADN"), Local Area Network ("LAN"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Maximum Bit Rate ("MBR"), Minimum Communication Range ("MCR"), Modulation Coding Scheme ("MCS"), Master Information Block ("MIB"), Multimedia Internet Keying ("MIKEY"), Multiple Input Multiple Output ("MIMO"), Mobility Management ("MM"), Mobility Management Entity ("MME"), Mobile Network Operator ("MNO"), Mobile Originated ("MO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDI"), Network Entity ("NE"), Network Exposure Function ("NEF"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSP"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Policy and Charging Control ("PCC"), Primary Cell ("PCell"), Policy Control Function ("PCF"), Physical Cell Identity ("PCP"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), PC5 QoS Class Identifier ("PQI"), Physical Random Access Channel ("PRACH"), Physical Resource Block ("PRB"), Proximity Services ("ProSe"), Positioning Reference Signal ("PRS"), Physical Sidelink Control Channel ("PSCCH"), Primary Secondary Cell ("PSCell"), Physical Sidelink Feedback Control Channel ("PSFCH"), Physical Uplink Control Channel ("PUCCH"), Physical Uplink Shared Channel ("PUSCH"), QoS Class Identifier ("QCI"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Block Assignment ("RBA"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management ("SM"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TAI"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Anything ("V2X"), V2X UE (e.g., a UE capable of vehicular communication using 3GPP protocols), Visiting AMF ("vAMF"), V2X Encryption Key ("VEK"), V2X Group Key ("VGK"), V2X MIKEY Key ("VMK"), Visiting NSSF ("vNSSF"), Visiting PLMN ("VPLMN"), V2X Traffic Key ("VTK"), Wide Area Network ("WAN"), and Worldwide Interoperability for Microwave Access ("WiMAX").

In certain wireless communications networks, there may be groups of search space sets.

BRIEF SUMMARY

Methods for performing actions based on a group switching flag are disclosed. Apparatuses and systems also perform the functions of the methods. One embodiment of a method includes configuring a user equipment with a plurality of groups of search space sets, wherein: the plurality of groups of search space sets comprises a first group of search space sets and a second group of search space sets; and the user equipment changes between monitoring the first group of search space sets and monitoring the second group of search space sets. In some embodiments, the method includes performing: a first set of actions in response to a presence of a group switching flag; a second set of actions in response to no presence of the group switching flag; or a combination thereof.

One apparatus for performing actions based on a group switching flag includes a processor that: configures a user equipment with a plurality of groups of search space sets, wherein: the plurality of groups of search space sets comprises a first group of search space sets and a second group of search space sets; and the user equipment changes between monitoring the first group of search space sets and monitoring the second group of search space sets; and performs: a first set of actions in response to a presence of a group switching flag; a second set of actions in response to no presence of the group switching flag; or a combination thereof.

Another embodiment of a method for performing actions based on a group switching flag includes transmitting information to a user equipment for configuring the user equipment with a plurality of groups of search space sets, wherein: the plurality of groups of search space sets comprises a first group of search space sets and a second group of search space sets; the user equipment changes between monitoring the first group of search space sets and monitoring the second group of search space sets; and the user equipment performs: a first set of actions in response to a presence of a group switching flag; a second set of actions in response to no presence of the group switching flag; or a combination thereof.

Another apparatus for performing actions based on a group switching flag includes a transmitter that transmits information to a user equipment for configuring the user equipment with a plurality of groups of search space sets, wherein: the plurality of groups of search space sets comprises a first group of search space sets and a second group of search space sets; the user equipment changes between monitoring the first group of search space sets and monitoring the second group of search space sets; and the user equipment performs: a first set of actions in response to a presence of a group switching flag; a second set of actions in response to no presence of the group switching flag; or a combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
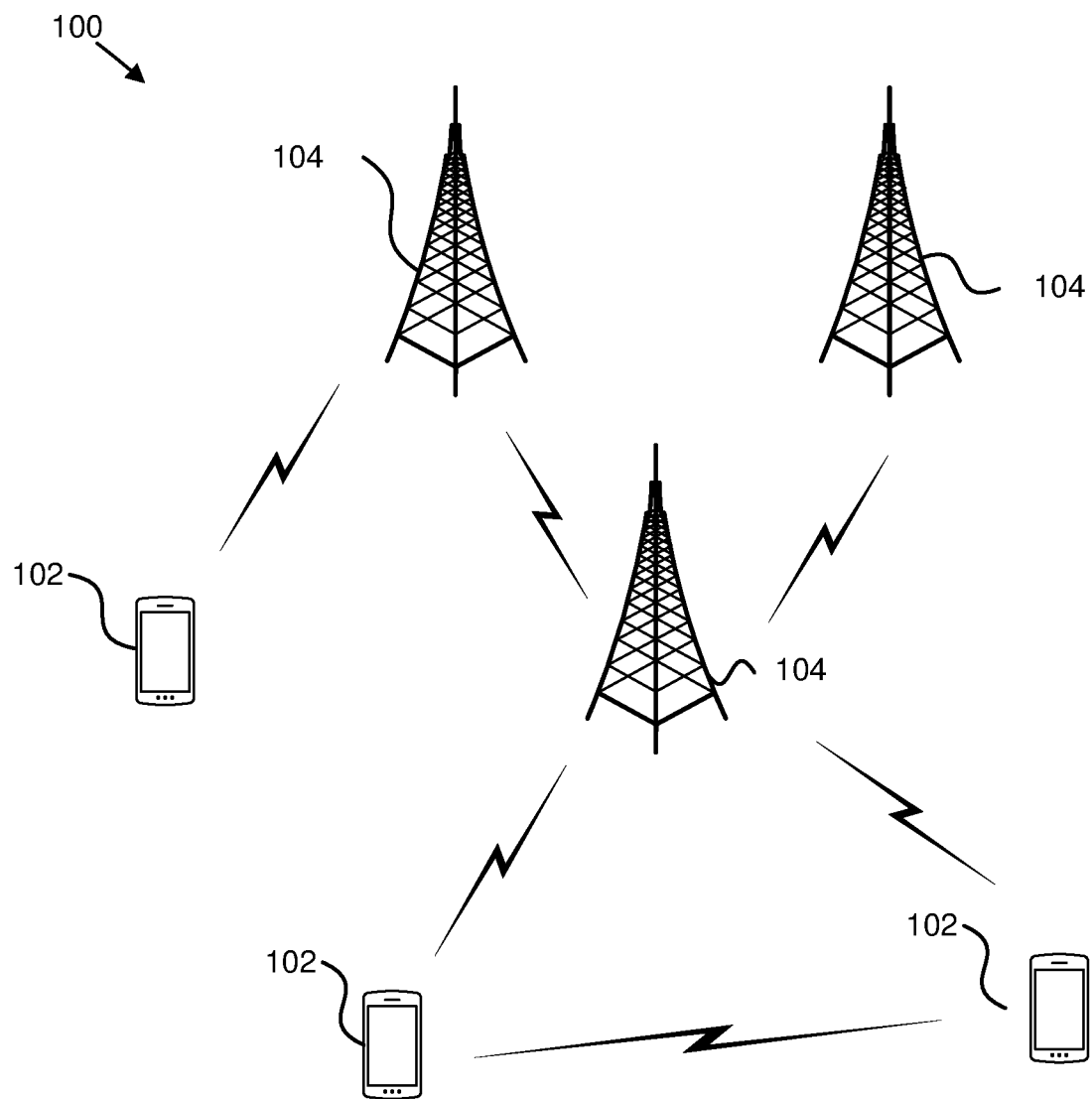
FIG. 1 is a schematic block diagram illustrating one embodiment of a wireless communication system for performing actions based on a group switching flag.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for performing actions based on a group switching flag. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, an AS, an NEF, a key management server, a KMF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may configure a user equipment (e.g. the remote unit 102) with a plurality of groups of search space sets, wherein: the plurality of groups of search space sets comprises a first group of search space sets and a second group of search space sets; and the user equipment 102 (e.g. the remote unit 102) changes between monitoring the first group of search space sets and monitoring the second group of search space sets. In some embodiments, the network unit 104 may perform: a first set of actions in response to a presence of a group switching flag; a second set of actions in response to no presence of the group switching flag; or a combination thereof. Accordingly, the remote unit 102 may be used for performing actions based on a group switching flag.

In certain embodiments, a network unit 104 may transmit information to a user equipment 102 (e.g. the remote unit 102) for configuring the user equipment 102 with a plurality of groups of search space sets, wherein: the plurality of groups of search space sets comprises a first group of search space sets and a second group of search space sets; the user equipment changes between monitoring the first group of search space sets and monitoring the second group of search space sets; and the user equipment performs: a first set of actions in response to a presence of a group switching flag; a second set of actions in response to no presence of the group switching flag; or a combination thereof. Accordingly, the network unit 104 may be used for performing actions based on a group switching flag.

Figure 2:
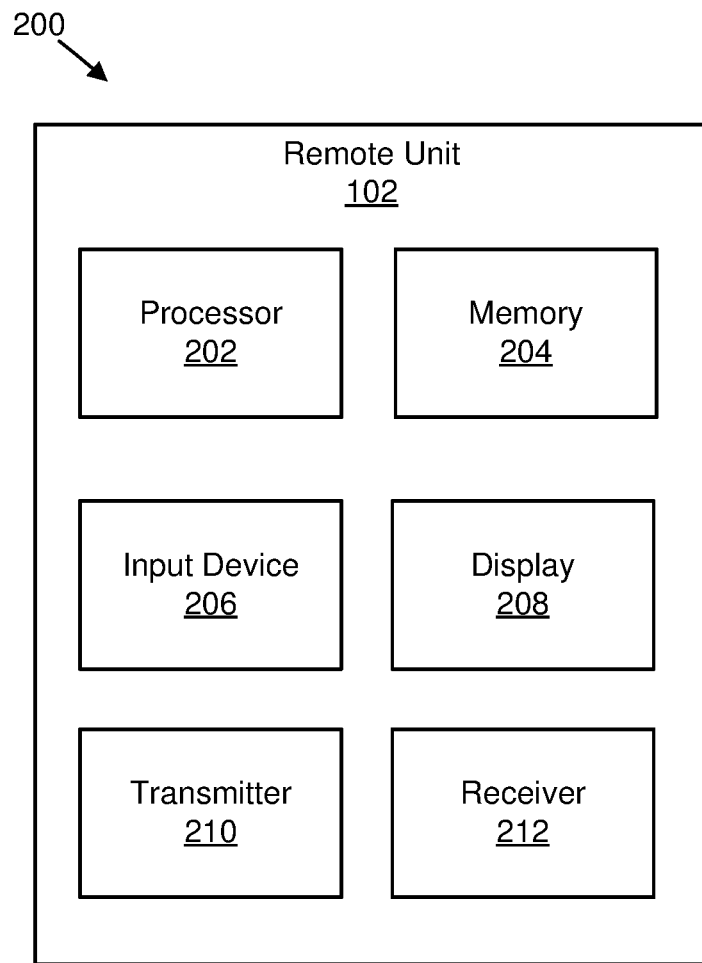
FIG. 2 is a schematic block diagram illustrating one embodiment of an apparatus that may be used for performing actions based on a group switching flag.

FIG. 2 depicts one embodiment of an apparatus 200 that may be used for performing actions based on a group switching flag. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the transmitter 210 may be used for transmitting information described herein and/or the receiver 212 may be used for receiving information described herein and/or the processor 202 may be used for processing information described herein.

In certain embodiments, the processor 202 may: configure a user equipment with a plurality of groups of search space sets, wherein: the plurality of groups of search space sets comprises a first group of search space sets and a second group of search space sets; and the user equipment changes between monitoring the first group of search space sets and monitoring the second group of search space sets; and performs: a first set of actions in response to a presence of a group switching flag; a second set of actions in response to no presence of the group switching flag; or a combination thereof.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
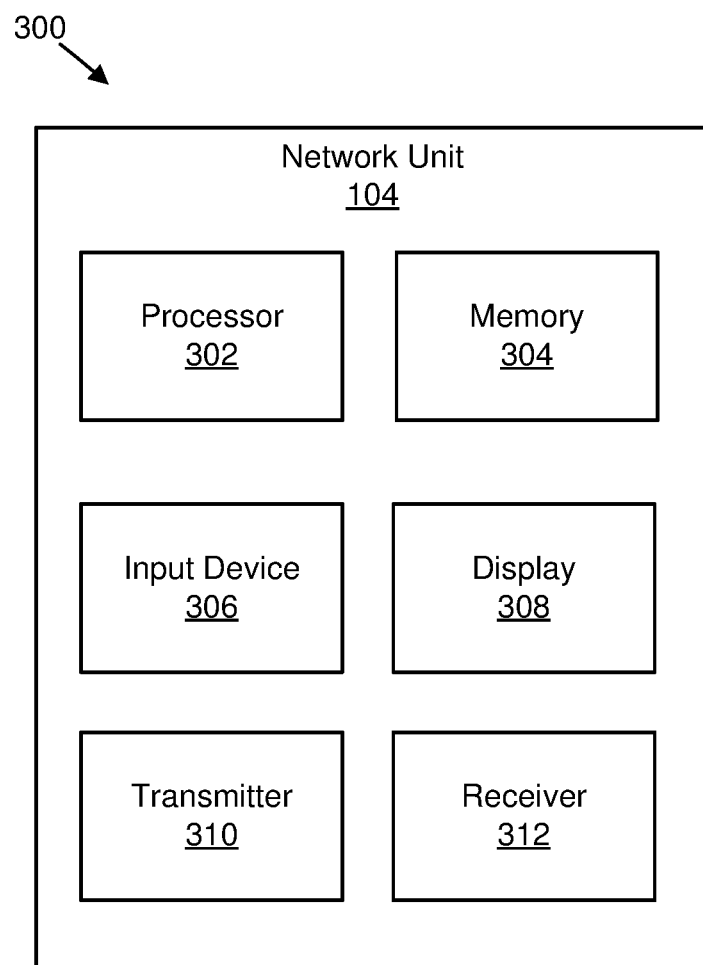
FIG. 3 is a schematic block diagram illustrating one embodiment of an apparatus that may be used for performing actions based on a group switching flag.

FIG. 3 depicts one embodiment of an apparatus 300 that may be used for performing actions based on a group switching flag. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310 may transmits information to a user equipment for configuring the user equipment with a plurality of groups of search space sets, wherein: the plurality of groups of search space sets comprises a first group of search space sets and a second group of search space sets; the user equipment changes between monitoring the first group of search space sets and monitoring the second group of search space sets; and the user equipment performs: a first set of actions in response to a presence of a group switching flag; a second set of actions in response to no presence of the group switching flag; or a combination thereof.

In certain embodiments, to have better control of a mobile terminal's power expended for PDCCH monitoring in at least an unlicensed carrier, it may be useful to support different PDCCH monitoring efforts. In such embodiments, rules may be defined for PDCCH monitoring efforts to be applied by the mobile terminal at a given time. In some embodiments, explicit control support and/or implicit change of PDCCH monitoring efforts may be defined and/or specified.

In various embodiments, a UE may be provided with at least two groups of search space sets for PDCCH. In such embodiments, the UE may be configured to switch between the groups. The switch between the groups may be indicated based one or more of the following alternatives: 1) implicitly (e.g., after detection of a DL burst, DM-RS, GC-PDCCH, and/or PDCCH and/or based on information on a COT structure); and 2) explicitly (e.g., in GC-PDCCH and/or PDCCH).

In certain embodiments, search space sets that are not part of configured groups (e.g., a common search space set) may be monitored by a UE regardless of a search space set indication. In some embodiments, a single search space set may be part of more than one group.

In various embodiments, a monitoring group flag may be configured to be present in a DCI format (e.g., DCI format 2_0). In certain embodiments, a UE may be configured to implicitly switch from a first search space set group to a second search space set group after detection of any PDCCH in the first search space set group at a slot boundary that is at least N symbols later then the last symbol of the detected PDCCH in the first search space set group.

In some embodiments, a UE may be configured to implicitly switch from a first search space set group to a second search space set group after detection of any DCI format (e.g., DCI format 2_0) in the first search space set group at a slot boundary that is at least N symbols later then the last symbol of the detected PDCCH in the first search space set group. In various embodiments, a UE switches from a second search space set group to a first search space set group if no PDCCH is detected in the second search space set group for a configurable time.

In certain embodiments, a first group of search space sets for PDCCH may be referred to herein as Group1, and a second group of search space sets for PDCCH may be referred to herein as Group2. In various embodiments, as used herein monitoring GC-PDCCH, being configured with GC-PDCCH, and/or being configured to monitor GC-PDCCH may refer to monitoring a DCI format (e.g., DCI format 2_0).

In some embodiments, a presence of a monitoring group flag in a DCI format (e.g., DCI format 2_0) may be configurable. In certain embodiments, if a monitoring group flag is present in a DCI format (e.g., DCI format 2_0), one or more of the following may be applicable: 1) if the monitoring group flag=1, this may mean to switch to (or keep) monitoring Group2 at a slot boundary that is at least N symbols later then a last symbol of the detected DCI format (e.g., DCI format 2_0); 2) if the monitoring group flag=0, this may mean to switch to (or keep) monitoring Group1 at a slot boundary that is at least N symbols later then the last symbol of the detected DCI format 2_0; 3) a UE may switch from Group2 to Group1 if no PDCCH is detected in Group2 for a configurable time M; and/or 4) the UE may switch from Group2 to Group1 at the end of a determined gNB's CO has ended.

In various embodiments, if a monitoring group flag is not present in a DCI format (e.g., DCI format 2_0), one or more of the following may be applicable: 1) if any PDCCH in Group1 is successfully detected, a UE may switch from Group1 to Group2 at a slot boundary that is at least N symbols later then the last symbol of the detected PDCCH in Group1; and/or 2) the UE may switch from Group2 to Group1 if no PDCCH is detected in Group2 for a configurable time M.

In embodiments described herein, value N may be configurable as one or more of a number of slots, symbols, and/or time units. The maximum value of N may be equivalent to one slot. Moreover, in embodiments described herein, time M may be configurable as one or more of a number of slots, symbols, and/or time units. The maximum value of M may be equivalent to a maximum channel occupancy.

In some embodiments, a monitoring group flag may be configurable to be present in one or more DCI formats (e.g., one or more of DCI formats 0_0, 0_1, 1_0, 1_1, 2_0). In such embodiments, a rule for switching groups may be dependent on a value of a flag in the one or more DCI formats.

In certain embodiments, if a monitoring group flag is not present in a first DCI format (e.g., DCI format 2_0), switching from Group1 to Group2 may be done if a PDCCH according to one or more DCI formats (e.g., one or more of DCI formats 0_0, 0_1, 1_0, 1_1, 2_0) are successfully detected in Group1.

In various embodiments, switching from Group2 to Group1 is done if no PDCCH (e.g., according to one or more DCI formats—such as one or more of DCI formats 0_0, 0_1, 1_0, 1_1, 2_0) is successfully detected in Group2 for a configurable time M.

In some embodiments, a UE follows the same behavior as if a monitoring group flag is not present in a DCI format (e.g., DCI format 2_0) if the UE is not monitoring for the DCI format (e.g., DCI format 2_0).

In certain embodiments, Group1 is a group (e.g., default group) that is monitored by a UE if there is switching of bandwidth parts, a handover, or if an RRC reconfiguration is being performed.

Figure 4:
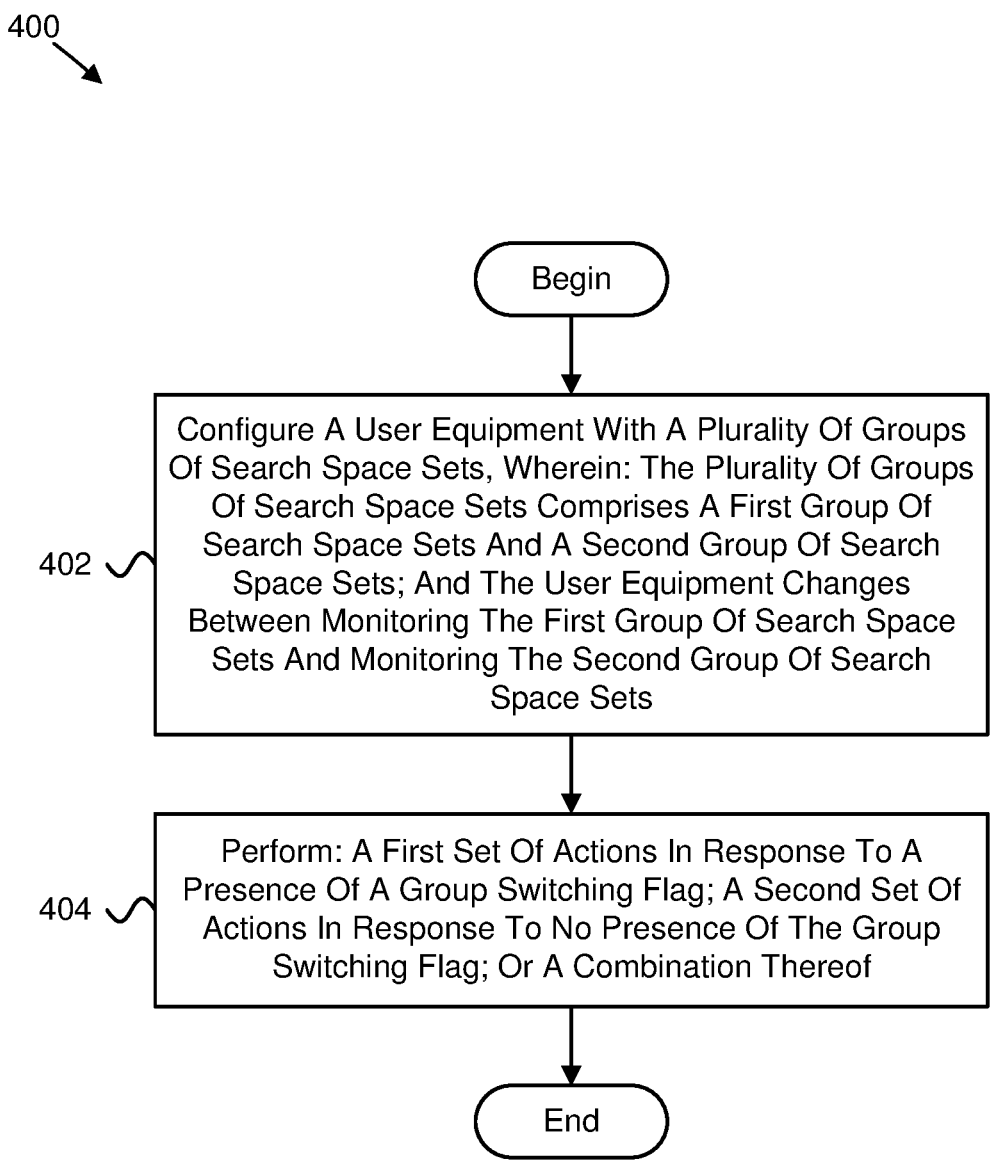
FIG. 4 is a flow chart diagram illustrating one embodiment of a method for performing actions based on a group switching flag.

FIG. 4 is a flow chart diagram illustrating one embodiment of a method 400 for performing actions based on a group switching flag. In some embodiments, the method 400 is performed by an apparatus, such as the remote unit 102. In certain embodiments, the method 400 may be performed by a processor executing program code, for example, a microcontroller, a microprocessor, a CPU, a GPU, an auxiliary processing unit, a FPGA, or the like.

In various embodiments, the method 400 includes configuring 402 a user equipment with a plurality of groups of search space sets, wherein: the plurality of groups of search space sets comprises a first group of search space sets and a second group of search space sets; and the user equipment changes between monitoring the first group of search space sets and monitoring the second group of search space sets. In some embodiments, the method 400 includes performing 404: a first set of actions in response to a presence of a group switching flag; a second set of actions in response to no presence of the group switching flag; or a combination thereof.

In certain embodiments, monitoring the first group of search space sets comprises physical downlink control channel monitoring the first group of search space sets and monitoring the second group of search space sets comprises physical downlink control channel monitoring the second group of search space sets. In some embodiments, the first set of actions comprises determining whether to change between monitoring the first group of search space sets and monitoring the second group of search space sets based on a value of the group switching flag. In various embodiments, the presence of the group switching flag is configurable in a downlink control information format.

In one embodiment, the downlink control information format comprises a downlink control information format 2_0. In certain embodiments, the first set of actions comprises stopping monitoring the second group of search space sets and starting monitoring the first group of search space sets based on a first value of the group switching flag. In some embodiments, the first set of actions comprises stopping monitoring the first group of search space sets and starting monitoring the second group of search space sets based on a second value of the group switching flag.

In various embodiments, the first set of actions comprises stopping monitoring the second group of search space sets and starting monitoring the first group of search space sets if no physical downlink control channel is detected in the second group of search space sets for a predetermined time. In one embodiment, the first set of actions is performed at a slot boundary. In certain embodiments, the slot boundary is at least a configured number of symbols later then a last symbol of a downlink control information format comprising the group switching flag.

In some embodiments, the slot boundary is at least a configured number of symbols later then a last symbol of a detected physical downlink control channel. In various embodiments, the second set of actions comprises, in response to detecting a downlink control information format in the first group of search space sets, stopping monitoring the first group of search space sets and starting monitoring the second group of search space sets. In one embodiment, the second set of actions comprises, in response to detecting a downlink control information format in the second group of search space sets, stopping monitoring the second group of search space sets and starting monitoring the first group of search space sets.

In certain embodiments, the second set of actions comprises stopping monitoring the second group of search space sets and starting monitoring the first group of search space sets if no physical downlink control channel is detected in the second group of search space sets for a predetermined time. In some embodiments, the second set of actions is performed at a slot boundary. In various embodiments, the slot boundary is at least a configured number of symbols later then a last symbol of a detected physical downlink control channel.

Figure 5:
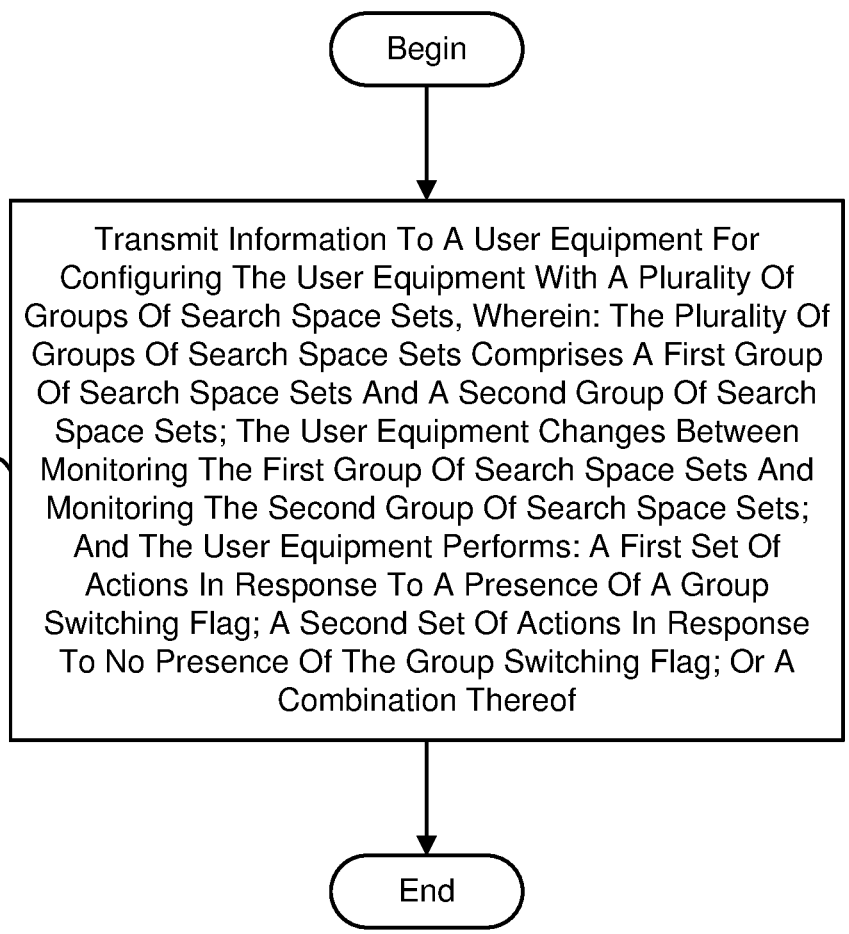
FIG. 5 is a flow chart diagram illustrating another embodiment of a method for performing actions based on a group switching flag.

FIG. 5 is a flow chart diagram illustrating another embodiment of a method 500 for performing actions based on a group switching flag. In some embodiments, the method 500 is performed by an apparatus, such as the network unit 104. In certain embodiments, the method 500 may be performed by a processor executing program code, for example, a microcontroller, a microprocessor, a CPU, a GPU, an auxiliary processing unit, a FPGA, or the like.

In various embodiments, the method 500 includes transmitting 502 information to a user equipment for configuring the user equipment with a plurality of groups of search space sets, wherein: the plurality of groups of search space sets comprises a first group of search space sets and a second group of search space sets; the user equipment changes between monitoring the first group of search space sets and monitoring the second group of search space sets; and the user equipment performs: a first set of actions in response to a presence of a group switching flag; a second set of actions in response to no presence of the group switching flag; or a combination thereof.

In certain embodiments, monitoring the first group of search space sets comprises physical downlink control channel monitoring the first group of search space sets and monitoring the second group of search space sets comprises physical downlink control channel monitoring the second group of search space sets. In some embodiments, the first set of actions comprises determining whether to change between monitoring the first group of search space sets and monitoring the second group of search space sets based on a value of the group switching flag. In various embodiments, the presence of the group switching flag is configurable in a downlink control information format.

In one embodiment, the downlink control information format comprises a downlink control information format 2_0. In certain embodiments, the first set of actions comprises stopping monitoring the second group of search space sets and starting monitoring the first group of search space sets based on a first value of the group switching flag. In some embodiments, the first set of actions comprises stopping monitoring the first group of search space sets and starting monitoring the second group of search space sets based on a second value of the group switching flag.

In various embodiments, the first set of actions comprises stopping monitoring the second group of search space sets and starting monitoring the first group of search space sets if no physical downlink control channel is detected in the second group of search space sets for a predetermined time. In one embodiment, the first set of actions is performed at a slot boundary. In certain embodiments, the slot boundary is at least a configured number of symbols later then a last symbol of a downlink control information format comprising the group switching flag.

In some embodiments, the slot boundary is at least a configured number of symbols later then a last symbol of a detected physical downlink control channel. In various embodiments, the second set of actions comprises, in response to detecting a downlink control information format in the first group of search space sets, stopping monitoring the first group of search space sets and starting monitoring the second group of search space sets. In one embodiment, the second set of actions comprises, in response to detecting a downlink control information format in the second group of search space sets, stopping monitoring the second group of search space sets and starting monitoring the first group of search space sets.

In certain embodiments, the second set of actions comprises stopping monitoring the second group of search space sets and starting monitoring the first group of search space sets if no physical downlink control channel is detected in the second group of search space sets for a predetermined time. In some embodiments, the second set of actions is performed at a slot boundary. In various embodiments, the slot boundary is at least a configured number of symbols later then a last symbol of a detected physical downlink control channel.

In one embodiment, a method comprises: configuring a user equipment with a plurality of groups of search space sets, wherein: the plurality of groups of search space sets comprises a first group of search space sets and a second group of search space sets; and the user equipment changes between monitoring the first group of search space sets and monitoring the second group of search space sets; and performing: a first set of actions in response to a presence of a group switching flag; a second set of actions in response to no presence of the group switching flag; or a combination thereof.

In certain embodiments, monitoring the first group of search space sets comprises physical downlink control channel monitoring the first group of search space sets and monitoring the second group of search space sets comprises physical downlink control channel monitoring the second group of search space sets.

In some embodiments, the first set of actions comprises determining whether to change between monitoring the first group of search space sets and monitoring the second group of search space sets based on a value of the group switching flag.

In various embodiments, the presence of the group switching flag is configurable in a downlink control information format.

In one embodiment, the downlink control information format comprises a downlink control information format 2_0.

In certain embodiments, the first set of actions comprises stopping monitoring the second group of search space sets and starting monitoring the first group of search space sets based on a first value of the group switching flag.

In some embodiments, the first set of actions comprises stopping monitoring the first group of search space sets and starting monitoring the second group of search space sets based on a second value of the group switching flag.

In various embodiments, the first set of actions comprises stopping monitoring the second group of search space sets and starting monitoring the first group of search space sets if no physical downlink control channel is detected in the second group of search space sets for a predetermined time.

In one embodiment, the first set of actions is performed at a slot boundary.

In certain embodiments, the slot boundary is at least a configured number of symbols later then a last symbol of a downlink control information format comprising the group switching flag.

In some embodiments, the slot boundary is at least a configured number of symbols later then a last symbol of a detected physical downlink control channel.

In various embodiments, the second set of actions comprises, in response to detecting a downlink control information format in the first group of search space sets, stopping monitoring the first group of search space sets and starting monitoring the second group of search space sets.

In one embodiment, the second set of actions comprises, in response to detecting a downlink control information format in the second group of search space sets, stopping monitoring the second group of search space sets and starting monitoring the first group of search space sets.

In certain embodiments, the second set of actions comprises stopping monitoring the second group of search space sets and starting monitoring the first group of search space sets if no physical downlink control channel is detected in the second group of search space sets for a predetermined time.

In some embodiments, the second set of actions is performed at a slot boundary.

In various embodiments, the slot boundary is at least a configured number of symbols later then a last symbol of a detected physical downlink control channel.

In one embodiment, an apparatus comprises: a processor that: configures a user equipment with a plurality of groups of search space sets, wherein: the plurality of groups of search space sets comprises a first group of search space sets and a second group of search space sets; and the user equipment changes between monitoring the first group of search space sets and monitoring the second group of search space sets; and performs: a first set of actions in response to a presence of a group switching flag; a second set of actions in response to no presence of the group switching flag; or a combination thereof.

In certain embodiments, monitoring the first group of search space sets comprises physical downlink control channel monitoring the first group of search space sets and monitoring the second group of search space sets comprises physical downlink control channel monitoring the second group of search space sets.

In some embodiments, the first set of actions comprises determining whether to change between monitoring the first group of search space sets and monitoring the second group of search space sets based on a value of the group switching flag.

In various embodiments, the presence of the group switching flag is configurable in a downlink control information format.

In one embodiment, the downlink control information format comprises a downlink control information format 2_0.

In certain embodiments, the first set of actions comprises stopping monitoring the second group of search space sets and starting monitoring the first group of search space sets based on a first value of the group switching flag.

In some embodiments, the first set of actions comprises stopping monitoring the first group of search space sets and starting monitoring the second group of search space sets based on a second value of the group switching flag.

In various embodiments, the first set of actions comprises stopping monitoring the second group of search space sets and starting monitoring the first group of search space sets if no physical downlink control channel is detected in the second group of search space sets for a predetermined time.

In one embodiment, the first set of actions is performed at a slot boundary.

In certain embodiments, the slot boundary is at least a configured number of symbols later then a last symbol of a downlink control information format comprising the group switching flag.

In some embodiments, the slot boundary is at least a configured number of symbols later then a last symbol of a detected physical downlink control channel.

In various embodiments, the second set of actions comprises, in response to detecting a downlink control information format in the first group of search space sets, stopping monitoring the first group of search space sets and starting monitoring the second group of search space sets.

In one embodiment, the second set of actions comprises, in response to detecting a downlink control information format in the second group of search space sets, stopping monitoring the second group of search space sets and starting monitoring the first group of search space sets.

In certain embodiments, the second set of actions comprises stopping monitoring the second group of search space sets and starting monitoring the first group of search space sets if no physical downlink control channel is detected in the second group of search space sets for a predetermined time.

In some embodiments, the second set of actions is performed at a slot boundary.

In various embodiments, the slot boundary is at least a configured number of symbols later then a last symbol of a detected physical downlink control channel.

In one embodiment, a method comprises: transmitting information to a user equipment for configuring the user equipment with a plurality of groups of search space sets, wherein: the plurality of groups of search space sets comprises a first group of search space sets and a second group of search space sets; the user equipment changes between monitoring the first group of search space sets and monitoring the second group of search space sets; and the user equipment performs: a first set of actions in response to a presence of a group switching flag; a second set of actions in response to no presence of the group switching flag; or a combination thereof.

In certain embodiments, monitoring the first group of search space sets comprises physical downlink control channel monitoring the first group of search space sets and monitoring the second group of search space sets comprises physical downlink control channel monitoring the second group of search space sets.

In some embodiments, the first set of actions comprises determining whether to change between monitoring the first group of search space sets and monitoring the second group of search space sets based on a value of the group switching flag.

In various embodiments, the presence of the group switching flag is configurable in a downlink control information format.

In one embodiment, the downlink control information format comprises a downlink control information format 2_0.

In certain embodiments, the first set of actions comprises stopping monitoring the second group of search space sets and starting monitoring the first group of search space sets based on a first value of the group switching flag.

In some embodiments, the first set of actions comprises stopping monitoring the first group of search space sets and starting monitoring the second group of search space sets based on a second value of the group switching flag.

In various embodiments, the first set of actions comprises stopping monitoring the second group of search space sets and starting monitoring the first group of search space sets if no physical downlink control channel is detected in the second group of search space sets for a predetermined time.

In one embodiment, the first set of actions is performed at a slot boundary.

In certain embodiments, the slot boundary is at least a configured number of symbols later then a last symbol of a downlink control information format comprising the group switching flag.

In some embodiments, the slot boundary is at least a configured number of symbols later then a last symbol of a detected physical downlink control channel.

In various embodiments, the second set of actions comprises, in response to detecting a downlink control information format in the first group of search space sets, stopping monitoring the first group of search space sets and starting monitoring the second group of search space sets.

In one embodiment, the second set of actions comprises, in response to detecting a downlink control information format in the second group of search space sets, stopping monitoring the second group of search space sets and starting monitoring the first group of search space sets.

In certain embodiments, the second set of actions comprises stopping monitoring the second group of search space sets and starting monitoring the first group of search space sets if no physical downlink control channel is detected in the second group of search space sets for a predetermined time.

In some embodiments, the second set of actions is performed at a slot boundary.

In various embodiments, the slot boundary is at least a configured number of symbols later then a last symbol of a detected physical downlink control channel.

In one embodiment, an apparatus comprises: a transmitter that transmits information to a user equipment for configuring the user equipment with a plurality of groups of search space sets, wherein: the plurality of groups of search space sets comprises a first group of search space sets and a second group of search space sets; the user equipment changes between monitoring the first group of search space sets and monitoring the second group of search space sets; and the user equipment performs: a first set of actions in response to a presence of a group switching flag; a second set of actions in response to no presence of the group switching flag; or a combination thereof.

In certain embodiments, monitoring the first group of search space sets comprises physical downlink control channel monitoring the first group of search space sets and monitoring the second group of search space sets comprises physical downlink control channel monitoring the second group of search space sets.

In some embodiments, the first set of actions comprises determining whether to change between monitoring the first group of search space sets and monitoring the second group of search space sets based on a value of the group switching flag.

In various embodiments, the presence of the group switching flag is configurable in a downlink control information format.

In one embodiment, the downlink control information format comprises a downlink control information format 2_0.

In certain embodiments, the first set of actions comprises stopping monitoring the second group of search space sets and starting monitoring the first group of search space sets based on a first value of the group switching flag.

In some embodiments, the first set of actions comprises stopping monitoring the first group of search space sets and starting monitoring the second group of search space sets based on a second value of the group switching flag.

In various embodiments, the first set of actions comprises stopping monitoring the second group of search space sets and starting monitoring the first group of search space sets if no physical downlink control channel is detected in the second group of search space sets for a predetermined time.

In one embodiment, the first set of actions is performed at a slot boundary.

In certain embodiments, the slot boundary is at least a configured number of symbols later then a last symbol of a downlink control information format comprising the group switching flag.

In some embodiments, the slot boundary is at least a configured number of symbols later then a last symbol of a detected physical downlink control channel.

In various embodiments, the second set of actions comprises, in response to detecting a downlink control information format in the first group of search space sets, stopping monitoring the first group of search space sets and starting monitoring the second group of search space sets.

In one embodiment, the second set of actions comprises, in response to detecting a downlink control information format in the second group of search space sets, stopping monitoring the second group of search space sets and starting monitoring the first group of search space sets.

In certain embodiments, the second set of actions comprises stopping monitoring the second group of search space sets and starting monitoring the first group of search space sets if no physical downlink control channel is detected in the second group of search space sets for a predetermined time.

In some embodiments, the second set of actions is performed at a slot boundary.

In various embodiments, the slot boundary is at least a configured number of symbols later then a last symbol of a detected physical downlink control channel.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
configuring the UE with a plurality of groups of search space sets, wherein:
the plurality of groups of search space sets comprises a first group of search space sets and a second group of search space sets; and
the UE changes between monitoring the first group of search space sets and monitoring the second group of search space sets; and performing:
a first set of actions in response to a presence of a single bit group switching flag, wherein the first set of actions comprises a first action based on a first bit value of the single bit group switching flag and a second action based on a second bit value of the single bit group switching flag; and
a second set of actions in response to no presence of the single bit group switching flag, wherein the second set of actions is different from the first set of actions.

2. The method of claim 1, wherein monitoring the first group of search space sets comprises physical downlink control channel monitoring the first group of search space sets and monitoring the second group of search space sets comprises physical downlink control channel monitoring the second group of search space sets.

3. The method of claim 1, wherein the first set of actions comprises determining whether to change between monitoring the first group of search space sets and monitoring the second group of search space sets based on a value of the single bit group switching flag.

4. The method of claim 1, wherein the presence of the single bit group switching flag is configurable in a downlink control information format, and wherein the downlink control information format comprises a downlink control information format 2_0.

5. The method of claim 1, wherein:
the first set of actions comprises stopping monitoring the second group of search space sets and starting monitoring the first group of search space sets based on a first value of the single bit group switching flag; or
the first set of actions comprises stopping monitoring the first group of search space sets and starting monitoring the second group of search space sets based on a second value of the single bit group switching flag.

6. The method of claim 1, wherein the first set of actions comprises stopping monitoring the second group of search space sets and starting monitoring the first group of search space sets if no physical downlink control channel is detected in the second group of search space sets for a predetermined time.

7. The method of claim 1, wherein the first set of actions is performed at a slot boundary.

8. The method of claim 7, wherein the slot boundary is at least a configured number of symbols later then a last symbol of a downlink control information format comprising the single bit group switching flag.

9. The method of claim 7, wherein the slot boundary is at least a configured number of symbols later then a last symbol of a detected physical downlink control channel.

10. The method of claim 1, wherein:
the second set of actions comprises, in response to detecting a downlink control information format in the first group of search space sets, stopping monitoring the first group of search space sets and starting monitoring the second group of search space sets; or
the second set of actions comprises, in response to detecting a downlink control information format in the second group of search space sets, stopping monitoring the second group of search space sets and starting monitoring the first group of search space sets.

11. The method of claim 1, wherein the second set of actions comprises stopping monitoring the second group of search space sets and starting monitoring the first group of search space sets if no physical downlink control channel is detected in the second group of search space sets for a predetermined time.

12. The method of claim 1, wherein the second set of actions is performed at a slot boundary.

13. The method of claim 12, wherein the slot boundary is at least a configured number of symbols later then a last symbol of a detected physical downlink control channel.

14. A user equipment (UE), comprising:
   at least one memory; and
   at least one processor coupled with the at least one memory and configured to cause the UE to:
      configure the UE with a plurality of groups of search space sets, wherein:
         the plurality of groups of search space sets comprises a first group of search space sets and a second group of search space sets; and
         the UE changes between monitoring the first group of search space sets and monitoring the second group of search space sets; and
      perform:
         a first set of actions in response to a presence of a single bit group switching flag, wherein the first set of actions comprises a first action based on a first bit value of the single bit group switching flag and a second action based on a second bit value of the single bit group switching flag; and
         a second set of actions in response to no presence of the single bit group switching flag, wherein the second set of actions is different from the first set of actions.

15. The UE of claim 14, wherein monitoring the first group of search space sets comprises physical downlink control channel monitoring the first group of search space sets and monitoring the second group of search space sets comprises physical downlink control channel monitoring the second group of search space sets.

16. The UE of claim 14, wherein the first set of actions comprises determining whether to change between monitoring the first group of search space sets and monitoring the second group of search space sets based on a value of the single bit group switching flag.

17. The UE of claim 14, wherein the presence of the single bit group switching flag is configurable in a downlink control information format, and wherein the downlink control information format comprises a downlink control information format 2_0.

18. The UE of claim 14, wherein:
   the first set of actions comprises stopping monitoring the second group of search space sets and starting monitoring the first group of search space sets based on a first value of the single bit group switching flag; or
   the first set of actions comprises stopping monitoring the first group of search space sets and starting monitoring the second group of search space sets based on a second value of the single bit group switching flag.

19. The UE of claim 14, wherein the first set of actions comprises stopping monitoring the second group of search space sets and starting monitoring the first group of search space sets if no physical downlink control channel is detected in the second group of search space sets for a predetermined time.

20. The UE of claim 14, wherein the first set of actions is performed at a slot boundary.

* * * * *